United States Patent [19]
Urban

[11] Patent Number: 4,635,838
[45] Date of Patent: Jan. 13, 1987

[54] BONDER FOR LEAD FRAMES

[76] Inventor: Peter Urban, Gärtnerstr. 44, 8208 Kolbermoor, Fed. Rep. of Germany

[21] Appl. No.: 818,400

[22] Filed: Jan. 13, 1986

Related U.S. Application Data

[63] Continuation of Ser. No. 578,782, Feb. 9, 1984, abandoned.

[30] Foreign Application Priority Data

Jan. 16, 1984 [DE] Fed. Rep. of Germany ... 8401090[U]

[51] Int. Cl.⁴ .............................................. B23K 37/04
[52] U.S. Cl. ...................................... 228/5.5; 228/1.1; 228/44.3
[58] Field of Search ............. 228/4.5, 5.5, 6.2, 44.1 A, 228/1.1; 269/275

[56] References Cited

U.S. PATENT DOCUMENTS

| | | | |
|---|---|---|---|
| 2,373,300 | 4/1945 | Ellinwood | 269/275 X |
| 3,052,461 | 9/1962 | Bateman | 269/275 X |
| 3,487,524 | 1/1970 | Filia | 269/275 X |
| 3,595,453 | 7/1971 | Sherry | |
| 3,692,225 | 9/1972 | Lincoln | 228/44.1 A X |
| 3,854,712 | 12/1974 | McGee | 269/275 X |
| 3,938,797 | 2/1976 | Frederick | 228/44.1 R X |
| 4,527,727 | 7/1985 | Renshaw | 228/1.1 |

FOREIGN PATENT DOCUMENTS 96648  7/1980  Japan .................................. 228/4.5

OTHER PUBLICATIONS

R. Tschernov, In "Elektronik Produktion+Prueftechnik", May 1983, pp. 258–260.

Primary Examiner—Robert P. Olszewski
Attorney, Agent, or Firm—Cushman, Darby & Cushman

[57] ABSTRACT

A bonder, comprising a bonding head, a fixed-cycle conveyor for structural elements, and a holder for structural elements comprising a clamping bar coordinated with the bonding head. For purposes of tension-free fixing and positioning of the structural element to be bonded the holder comprises a resilient support face for the structural element, which support face is coordinated with the clamping bar. Preferably also the clamping side of the clamping bar is provided with a resilient layer, e.g. in the form of a rubber bead.

8 Claims, 3 Drawing Figures

BONDER FOR LEAD FRAMES

This is a continuation of application Ser. No. 578,782, filed Feb. 9, 1984, which was abandoned upon the filing hereof.

The instant invention relates to a bonder, comprising a bonding head, a fixed-cycle conveyor for structural elements, and a holding means for structural elements comprising a clamping member and being coordinated with the bonding head.

FIELD OF THE INVENTION

In the production of microcircuitry or integrated circuits electrical connections must be made between individual circuits located on a chip or substrate and external terminals. To this end, usually, thin gold or aluminum wires having a diameter of from about 25 to 500 micrometers are welded to the individual contact points or surfaces which also each consist of thin gold or aluminum layers and are electrically connected to the corresponding circuits or external terminals. This attachment of wires by welding is also referred to as "bonding" and it is carried out under the influence of pressure and in addition by energy supply in the form of ultrasonic and/or direct thermal energy.

BACKGROUND OF THE INVENTION

The present invention in the first place is concerned with a contacter or bonder by means of which a thin aluminum wire is welded under the action of pressure and ultrasound to a contact point of electrical or electronic structural elements, particularly semiconductor elements etc. The aluminum wire is applied by a bonding head which comprises a wire supply means and an ultrasonically excitable press die, the so-called wedge.

The structural elements to be bonded are being fed from a magazine to the bonding head by a fixed-cycle conveyor. At the bonding head they are positioned by a retainer or holding means, then they are bonded, and subsequently transported to another magazine. In the bonding, especially of elongated structural elements or structural elements tending to warp and having a plurality of contact surfaces to be bonded, in other words structural element carriers or so-called lead frames, problems are encountered in the accurate positioning or coordination of the same with respect to the bonding head. For instance, contamination of the underside of the frame and/or of the support surface or base of the frame and/or surface irregularities and/or punching inaccuracies (burrs) of the frames will cause the frames not to lie flat or entirely flush on the support or base, when being fixed thereto by a clamp or the like. This will result in an undefined vibrational mode of the frame which may have such an influence on the ultrasonic vibration of the wedge and thereby change the welding process in such a way that the welding or bonding achieved is incomplete. Contaminations etc. of no more than 1 to 2 micrometers may be sufficient to cause that. The production of waste caused by the deficiency described above is correspondingly high.

SUMMARY OF THE INVENTION

It is therefore an object of the instant invention to overcome the disadvantages mentioned and to design the holding means for the structural elements such that bonding without waste production will be guaranteed.

This object is met, in accordance with the invention, in that the structural element holding means comprises a flexibly yielding or resilient support face for the structural element to be bonded, which support face is coordinated with the clamping member.

The resilient support face which is associated with the clamping bar and supports the structural element warrants that even in case of surface irregularities or contaminations between the structural element and the support face the structural element still will be held flush and without tensions. The deficiencies mentioned will not cause an alteration of the vibrational mode of the structural element to be bonded. Instead, a constant, well defined bonding is guaranteed.

Surprisingly, the solution according to the invention permits the use of a clamping jaw or clamping strip or bar which is effective approximately throughout the full length of the structural element to be bonded (lead frames having a length of up to 20 to 25 cm). Such a clamping bar offers enormous advantages in the manufacturing technique, as compared to an individual clamp which acts only in the direct range of the bonding head.

Usually, an individual clamp only which is effective in the direct range of the bonding head or of the contact point to be bonded is coordinated with the bonding head. During bonding, this clamp presses the structural element against a rigid or hard base or support face, thus retaining it in bonding position. When bonding elongated structural elements, such as lead frames having a plurality of contact surfaces which are mutually spaced in the direction of feed and using a stationary bonding head, the clamp is released after each bonding process, the lead frame is passed on to the next contact surface, the clamp is tightened once more, etc. After each clamping procedure the bonding head is allocated the optimum bonding location by means of an optical finder. It is obvious that a considerable amount of time is lost for indexing (loosening and tightening the clamp and transporting the frame) and searching (coordinating the bonding head by the optical finder means). It amounts to approximately 300 ms.

Using the clamping bar mentioned which extends effectively throughout the length of the structural element to be bonded affords great savings in time. The proportionate time requirement is no more than approximately 90 to 100 microseconds per unit to be bonded. This saving in time is made possible because the clamping bar need not be opened and closed following each individual bonding procedure. Instead, the clamping bar is not opened until all contact points or contact surfaces have been bonded. Moreover, the optimum location may be determined optically for the next contact surface while the bonding of the preceding one is under way.

Of course, the use of a clamping bar which is effective across the full length of the structural element to be bonded will cause no problems only if the support face for the structural element is designed to be elastically yielding or resilient throughout the clamping distance. As explained above, this will warrant that the structural element is fixed in flush abutment and without tensions along its entire length.

The resilient support face preferably is an integral part of the conveyor path for the structural elements and is formed by an elastically yielding or resilient layer disposed on a rigid base. The resilient layer preferably is a strip of rubber, caoutchouc, or the like having only little thickness. Possible layer thicknesses range from about 0.3 to 1.5 mm, depending on the flexural stiffness of the structural element to be bonded.

An advantageous structure which proved successful in tests is characterized in that the clamping bar also is designed to be resilient in clamping direction. To achieve that it comprises at least two, preferably up to ten or more clamping fingers of the type of leaf springs arranged side by side and slightly spaced from one another. This structural design also contributes to the tension-free fixing of the structural elements to be bonded, particularly of lead frames tending to warp. With this embodiment it is advantageous to have a clamping finger associated with each contact point or surface to be bonded.

The resilient character of the clamping bar also may be obtained by arranging a resilient layer of plastics, rubber, or the like at the clamping side. This layer preferably is embodied by a rubber bead extending along the entire length of the clamping bar. In a specific embodiment the rubber bead is part of a rubber band stretched around the clamping bar.

The structural element to be bonded may be fixed by clamping in that the resilient support face is movable toward the clamping bar. It is just as well conceivable that the clamping bar be adapted to reciprocate between clamping and release positions. In both cases the movements are effected by a control cam or cam disc, for instance against the force of a return spring.

The invention will be described further, by way of a particularly advantageous embodiment, with reference to the accompanying drawings, in which:

DESCRIPTION OF THE PREFERRED EMBODIMENTS OF THE INVENTION

Figure 1:
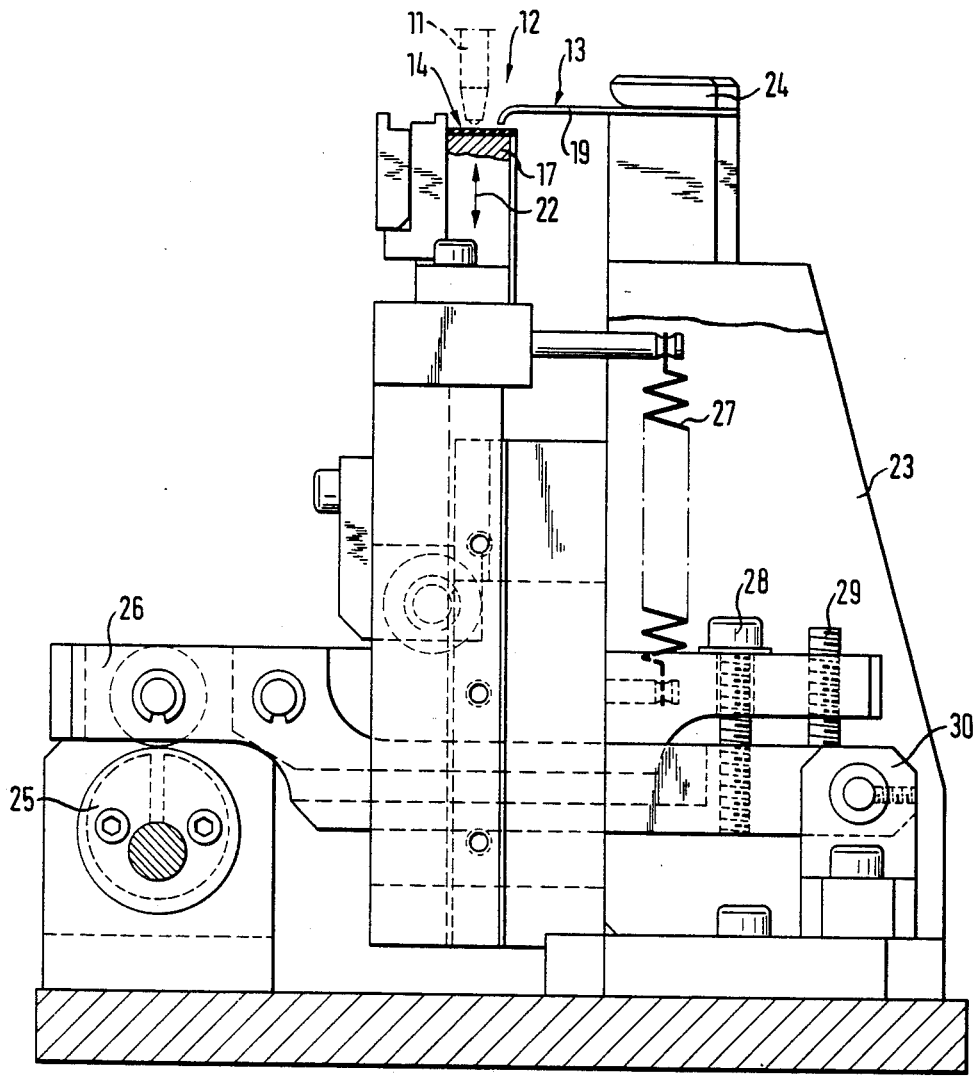
FIG. 1 is a side elevational view, partly in section, of a bonder including a holding means for structural elements designed in accordance with the invention.
Figure 2:
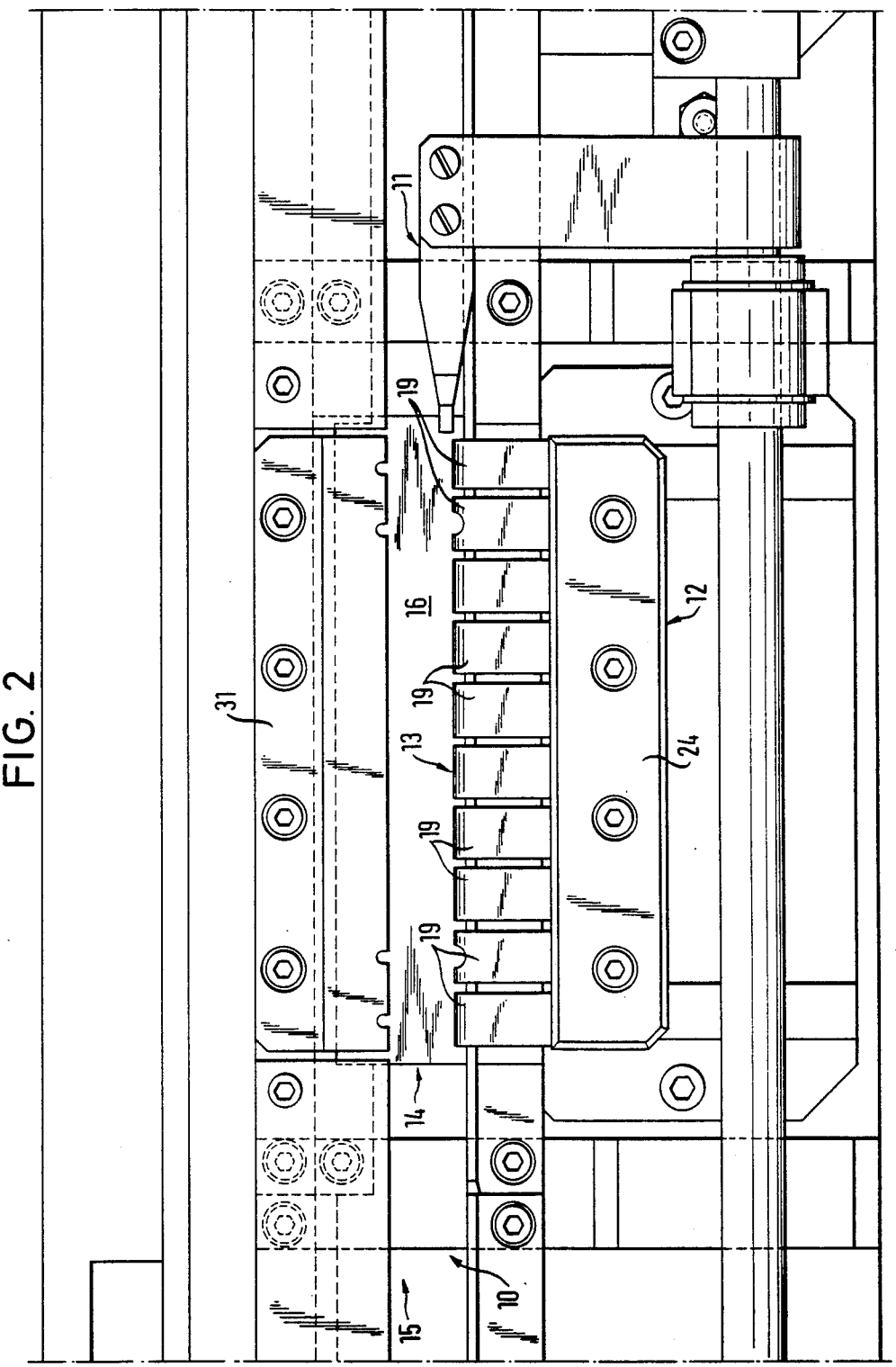
FIG. 2 is a top plan view of the holding means of the bonder shown in FIG. 1.

The bonder shown in FIGS. 1 and 2 comprises a bonding head 11, merely traced by a discontinuous line in FIG. 1, a fixed-cycle conveyor 10 defining a rectilinear conveyor path 15, and a holding means 12 for structural elements coordinated with the bonding head 11 and including a clamping bar 13 which has ten clamping fingers 19 (FIG. 2) of the type of leaf springs disposed side by side and slightly spaced from one another. The leaf-spring-like clamping fingers 19 each are bent downwardly, as seen in FIG. 1, forming a knee at their free ends which are not fixed. A resilient support face 14 for structural elements to be bonded (indicated diagrammatically in FIG. 3 and marked by reference numeral 18) is coordinated with the clamping fingers 19. This resilient support face 14 is constituted by a thin rubber strip 16 placed on a rigid base 17. With the embodiment according to FIGS. 1 and 2 the rigid base (anvil) 17 is supported in a frame 23 so as to be movable up and down in the direction of double arrow 22. In this manner the structural element to be bonded can be moved from a feeding position into a clamping and bonding position and vice versa. A fastening strip 24 serves to fix the clamping bar 13 or clamping fingers 19 in stationary position in the embodiment shown in FIGS. 1 and 2. In this manner the clamping bar 13 or clamping fingers 19 are exchangeably secured to the frame 23.

A cam disc 25 supported in the frame 23 so as to be driven in rotation and acting on the rigid base 17 through a rocker arm 26 causes the up and down motions of the rigid base 17 under the resilient support face 14, in the direction of double arrow 22. The movement of the rigid base 17 into the position to clamp the structural element, or upwardly as seen in FIG. 1, is effected against the force of a restoring spring 27 secured, on the one hand, to the rigid base 17 and, on the other hand, to the fram 23. The relative position between the rigid base 17 and the rocker arm 26 is adjustable by a screw whereby the level of the lifting distance of the rigid base 17 is adaptable to different thicknesses of structural elements. A separate locking screw 28 serves to fix the relative position between the rigid base 17 and the rocker arm 26. The rocker arm 26 is supported for swinging movement in a pivot bearing 30 disposed in the frame 23 at a distance from the cam disc 25, the pivot axis defined by the pivot bearing 30 extending parallel to the axis of rotation of the cam disc 25.

Of course, the upward and downward movements of the rigid base 17 take place only within the clamping range of the holding means 12 for the structural elements. In this range, therefore, the conveyor path 15 comprises a section which is adapted to be moved up and down.

As may be taken from FIG. 2, the holding means for the structural elements, in addition, comprises a continuous clamping bar 31 positioned opposite the clamping bar 13 or the clamping fingers 19 in the form of leaf springs. These two clamping jaws or clamping bars 13, 31 permit a lead frame to be held by clamping along both its longitudinal edges which extend in parallel with the feeding direction. For the sake of better clarity, clamping bar 31 is left out in the presentation of FIG. 1. Just like clamping jaw or clamping bar 13 also clamping bar 31 is secured to the frame 23 so as to be stationary and exchangeable. Lifting motions of the rigid base 17 effect the clamping in the range of the clamping bar 31 as well as in the range of the clamping fingers 19 of the type of leaf springs.

When a lead frame is to be bonded it is transported by the fixed-cycle conveyor 10 along conveyor path 15 into the area of the holding means 12 where it is clamped and then, in this condition, moved stepwise past the bonding head 11, the lengths of the steps being determined by the spacings between the contact points or contact surfaces to be bonded. It is only after all contact surfaces have been bonded that the lead frame is released again by the holding means 12 and moved on. The clamping bars are returned to their starting positions to clamp another lead frame and convey the same stepwise past the wedge.

Figure 3:
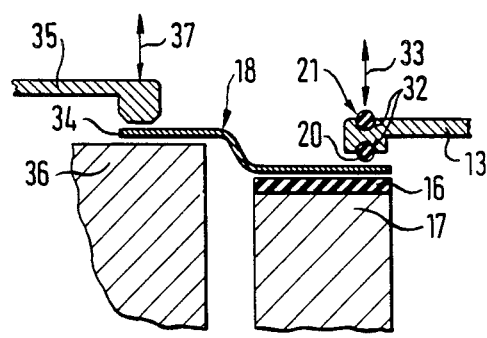
FIG. 3 is a part sectional view of a modified structural element holding means.

With the embodiment shown in FIG. 3 not only the rigid base 17 but also the clamping bar 13 is provided at the clamping side with a resilient layer of plastics, rubber, and the like. At the clamping bar 13 the resilient layer is embodied by a rubber bead 20 which extends throughout the full length of the clamping bar and is part of a rubber band 21 stretched around the clamping bar 13. The rubber band 21, being a part subject to relatively great wear, has the advantage of being easily exchangeable. The rubber band 21 is held in longitudinal grooves 32 formed in the clamping bar 13. With the embodiment shown in FIG. 3 it is not the rigid base 17 but instead the clamping bar 13 disposed above the same which is supported in the frame (not shown) of the bonder so as to be movable up and down in the direction of double arrow 33 to fix the structural element 18 (cranked lead frame) by clamping and release it. However, it is just as feasible to design only the base (anvil) to be movable up and down for clamping, similar to the embodiment shown in FIGS. 1 and 2. It is also conceivable to have both the base and the clamping bars movable towards each other for clamping.

The longitudinal edge 34 of the lead frame 18 disposed opposite the clamping bar 13 is adapted to be clamped by a rigid clamping bar 35 corresponding to clamping bar 31 in FIG. 2. In this case neither the rigid base 36 nor the clamping bar 35 is provided with a resilient layer. The clamping bar 35 is supported in the frame of the bonder for up and down movements in the direction of double arrow 37, i.e. it is adapted to be moved into and out of its clamping position. In a manner similar to rigid base 17, of course, also base 36 may be designed to be movable in upward and downward directions. In that event a common drive preferably causes synchronous movements of the bases 17 and 36.

The clamping surfaces of the base 36 and of the clamping bar 35 also may be provided with a thin resilient layer, depending on the lead frame 18 to be bonded or on its flexural sensitivity. The same applies to the supporting surface associated with clamping bar 31 of FIG. 2.

With the embodiment according to FIG. 3 the lead frame 18 has a cross section which is bent twice so that the two longitudinal edges thereof lie at different levels. Accordingly, the two clamping means for the longitudinal edges act on different levels.

The bonding also may be effected by moving the bonding head in stepwise fashion while the holding means for the structural elements is stationary during the bonding procedure, instead of passing the clamped structural element or lead frame in stepwise motion past the bonding head 11. This kinematic reversal of motions which is within the limits of the present invention permits a minimum of index time to be achieved.

All features disclosed in the documents are claimed as essential of the invention to the extent that they are novel as compared to the state of the art, either individually or in combination.

What is claimed is:

1. A bonder for lead frames, each including at least two contact surfaces to be bonded, said bonder comprising:
    an ultrasonic bonding head;
    an optical finder for searching the contact surface to be bonded;
    a conveyor for the lead frames; and
    a holding means for the lead frames to be bonded, said holding means comprising a clamping bar coordinated with said bonding head and a rubber-like flexible-yielding resilient layer having a thickness of between 0.3 to 1.5 mm as support for the lead frames to be bonded, said layer being coordinated with the said clamping bar and the length of said resilient layer corresponding approximately to the maximum length of the lead frames to be bonded, so that the clamping bar is not to be opened until all contact surfaces of one lead frame have been bonded and so that the optimum location on the contact surface to be bonded next can be determined optically by the optical finder while the preceding contact surface is being bonded.

2. The bonder as claimed in claim 1, characterized in that the resilient layer is an integral part of the conveyor path for the lead frames.

3. The bonder as claimed in claim 1, characterized in that the clamping bar is designed to be resilient in the clamping direction.

4. The bonder as claimed in claim 3, characterized in that the clamping bar comprises at least two clamping fingers like leaf springs arranged side by side and slightly spaced from one another.

5. The bonder as claimed in claim 3, characterized in that the clamping bar is provided at its clamping side with a resilient layer in the form of a rubber bead extending throughout the length of the clamping bar.

6. The bonder as claimed in claim 5, characterized in that the rubber bead is part of a rubber band stretched around the clamping bar.

7. The bonder as claimed in claim 1, characterized in that the resilient layer is a conveyor path section adapted to be moved toward and away from the clamping bar.

8. The bonder as claimed in claim 1, characterized in that the resilient layer is disposed to be stationary in the frame of the bonder, while the clamping bar is movable from a non-clamping position into a clamping position and vice versa.

* * * * *